(12) United States Patent
Morihisa

(10) Patent No.: US 11,788,977 B2
(45) Date of Patent: Oct. 17, 2023

(54) X-RAY FLUORESCENCE ANALYZER COMPRISING A MEASUREMENT DEVICE, SAMPLE TRAYS, AND A TRANSFER DEVICE FOR TRANSFERRING A SAMPLE CELL BETWEEN THE MEASUREMENT DEVICE AND THE SAMPLE TRAYS

(71) Applicant: Shimadzu Corporation, Kyoto (JP)

(72) Inventor: Yuji Morihisa, Kyoto (JP)

(73) Assignee: S himadzu Corporation, Kyoto (JP)

( * ) Notice: Subject to any disclaimer, the term of this patent is extended or adjusted under 35 U.S.C. 154(b) by 101 days.

(21) Appl. No.: 17/134,026

(22) Filed: Dec. 24, 2020

(65) Prior Publication Data

US 2021/0270757 A1 Sep. 2, 2021

(30) Foreign Application Priority Data

Feb. 27, 2020 (JP) ................................. 2020-031359

(51) Int. Cl.
*G01N 23/223* (2006.01)
*G01N 23/2204* (2018.01)

(52) U.S. Cl.
CPC ....... *G01N 23/223* (2013.01); *G01N 23/2204* (2013.01); *G01N 2223/076* (2013.01); *G01N 2223/309* (2013.01); *G01N 2223/637* (2013.01)

(58) Field of Classification Search
CPC .. G01N 23/22; G01N 23/2204; G01N 23/223; G01N 2223/076; G01N 2223/637; G01N 2223/309

(Continued)

(56) References Cited

U.S. PATENT DOCUMENTS 4,810,776 A * 3/1989 Karlhuber ............ G01N 23/223
526/60
5,408,512 A * 4/1995 Kuwabara .......... G01N 23/2076
378/45

(Continued)

FOREIGN PATENT DOCUMENTS

JP H05256802 A 10/1993
JP H10-54810 A 2/1998
JP H11108863 A 4/1999

OTHER PUBLICATIONS

An English translation of JPH10-54810A by Patent Translate. (Year: 2022).*

(Continued)

*Primary Examiner* — Allen C. Ho
(74) *Attorney, Agent, or Firm* — Muir Patent Law, PLLC

(57) ABSTRACT

Provided is an X-ray fluorescence analyzer capable of preventing a liquid sample from being measured in a vacuum atmosphere. A processing device is configured to analyze a sample according to an analysis condition set by a user. An analysis condition includes an atmospheric condition that defines the state of the atmosphere in a measurement chamber of a measurement device. The measurement device is provided with an exhaust device for exhausting an atmosphere in the measurement chamber. The processing device prohibits or stops the operation of the exhaust device when it is detected that the sample is a liquid by the detection device for detecting whether or not the sample is a liquid in a case where the atmospheric condition is set to a vacuum atmosphere.

11 Claims, 9 Drawing Sheets

(58) Field of Classification Search
USPC .................................................. 378/44–50
See application file for complete search history.

(56) References Cited

U.S. PATENT DOCUMENTS

| | | | | |
|---|---|---|---|---|
| 5,657,363 | A * | 8/1997 | Hossain | G01N 23/223 378/45 |
| 5,832,054 | A * | 11/1998 | Kuwabara | G01N 23/223 378/80 |
| 5,982,847 | A * | 11/1999 | Nelson | G01N 23/221 378/45 |
| 6,052,429 | A * | 4/2000 | Ohno | G01N 23/223 378/45 |
| 6,233,307 | B1 * | 5/2001 | Golenhofen | G01N 23/223 714/E11.21 |
| 6,314,158 | B1 * | 11/2001 | Shiota | G01N 23/223 378/49 |
| 6,735,276 | B2 * | 5/2004 | Ikeshita | G01N 23/223 378/45 |
| 6,937,691 | B2 * | 8/2005 | Yamagami | G01N 23/223 378/45 |
| 7,065,174 | B2 * | 6/2006 | Sipilä | G01N 23/223 378/45 |
| 7,277,527 | B2 * | 10/2007 | Gallagher | G01N 33/2835 378/47 |
| 7,409,037 | B2 * | 8/2008 | Puusaari | G01N 23/223 378/45 |
| 7,515,685 | B2 * | 4/2009 | Iwamoto | G01N 23/223 378/79 |
| 7,519,145 | B2 * | 4/2009 | Warner | G01N 23/223 378/47 |
| 7,587,025 | B2 * | 9/2009 | Fukai | G01N 23/223 378/86 |
| 7,970,101 | B2 * | 6/2011 | Sakai | G01N 23/223 378/45 |
| 8,000,439 | B2 * | 8/2011 | Matoba | G01N 23/223 378/45 |
| 8,050,382 | B2 * | 11/2011 | Chen | G01N 23/223 378/47 |
| 8,433,035 | B2 * | 4/2013 | Watanabe | G01N 23/223 378/46 |
| 8,582,717 | B2 * | 11/2013 | Ohzawa | G01N 23/223 378/45 |
| 9,116,106 | B2 * | 8/2015 | Goto | G21K 1/025 |
| 9,116,107 | B2 * | 8/2015 | Goto | G01N 23/223 |
| 9,810,649 | B2 * | 11/2017 | Takahara | G21F 3/00 |
| 9,989,484 | B2 * | 6/2018 | Yamagami | G01N 23/223 |
| 10,168,290 | B2 * | 1/2019 | Furukawa | G01N 23/223 |
| 10,180,404 | B2 * | 1/2019 | Suzuki | G01N 23/223 |
| 10,663,415 | B2 * | 5/2020 | Yoneda | G01N 23/223 |
| 10,816,488 | B2 * | 10/2020 | Troadec | G01N 33/30 |
| 10,823,688 | B2 * | 11/2020 | Akiyama | G01N 23/223 |
| 10,837,925 | B1 * | 11/2020 | Suzuki | G01K 7/16 |
| 10,948,435 | B2 * | 3/2021 | Furukawa | G01N 23/223 |
| 11,022,572 | B2 * | 6/2021 | Yamagami | B01L 3/0241 |
| 11,125,703 | B2 * | 9/2021 | Taroura | G01N 23/223 |

OTHER PUBLICATIONS

Office Action, dated Jan. 24, 2023, issued by the Japanese Patent Office for corresponding Japanese Patent Application No. 2020-031359.

* cited by examiner

X-RAY FLUORESCENCE ANALYZER COMPRISING A MEASUREMENT DEVICE, SAMPLE TRAYS, AND A TRANSFER DEVICE FOR TRANSFERRING A SAMPLE CELL BETWEEN THE MEASUREMENT DEVICE AND THE SAMPLE TRAYS

CROSS-REFERENCE TO RELATED APPLICATIONS

This application claims priority under 35 U.S.C. § 119 to Japanese Patent Application No. 2020-031359 filed on Feb. 27, 2020, the entire disclosure of which is incorporated herein by reference in its entirety.

TECHNICAL FIELD

The present disclosure relates to an X-ray fluorescence analyzer.

BACKGROUND OF THE INVENTION

In a fluorescent X-ray analysis for analyzing constituent elements of a sample by irradiating the sample with X-rays and measuring fluorescent X-rays emitted from the sample, when a measurement is performed in the atmospheric air, the X-rays are attenuated by elements in the atmospheric air, which may affect the measurement results, especially in the light element analysis. Therefore, in order to eliminate the effects of the atmosphere at the time of the measurement to achieve a highly sensitive measurement, the atmospheric air in the measurement chamber is exhausted, or the atmospheric air in the measurement chamber is replaced with a gas lighter than the atmospheric air.

For example, Japanese Unexamined Patent Application Publication No. 10-54810 (hereinafter "Patent Document 1") discloses an X-ray analyzer capable of performing a measurement in a vacuum atmosphere in which the atmospheric air in the measurement chamber is exhausted, or in a helium atmosphere in which the atmospheric air is replaced with a helium gas. In this X-ray analyzer, a sample table capable of placing a plurality of samples thereon is provided in a measurement chamber, and a plurality of samples is sequentially moved to an observing position by rotating the sample table. Thus, the plurality of samples can be measured continuously (see Patent Document 1).

PRIOR ART DOCUMENT

Patent Document

Patent Document 1: Japanese Unexamined Patent Application Publication No. 10-54810

SUMMARY OF THE INVENTION

Problems to be Solved by the Invention

As a sample includes, in addition to a solid sample and a powder sample, there exists a liquid sample. A liquid sample volatilizes in a vacuum atmosphere. Therefore, for a liquid sample, an ambient atmosphere or a helium atmosphere is selected. When a vacuum atmosphere is selected for a liquid sample, the following various issues arise. That is, the liquid sample vaporizes, and the vaporization may cause the degree of vacuum in the measurement chamber to fail to reach the target vacuum level. Therefore, the exhaust device for exhausting the air in the measurement chamber may be overloaded. In addition, there is a possibility that an accurate measurement cannot be performed due to a change in the amount or concentration of the liquid sample. Such a problem and a solution to such a problem have not been considered particularly in Patent Document 1.

It is an object of the present disclosure to solve the above-described problems. An object of the present disclosure is to provide an X-ray fluorescence analyzer capable of preventing the measurement from being performed in a vacuum atmosphere with respect to a liquid sample.

Means for Solving the Problem

An X-ray fluorescence analyzer of this disclosure is an X-ray fluorescence analyzer for analyzing a sample by irradiating a surface of the sample with X-rays and detecting fluorescent X-rays generated from the surface. The X-ray fluorescence analyzer is provided with a measurement chamber, an exhaust device, a control device, and a detection device. In the measurement chamber, irradiation of the X-rays and detection of the fluorescent X-rays are performed. The exhaust device is configured to exhaust an atmosphere in the measurement chamber. The control device is configured to analyze the sample according to an analysis condition set by a user. The detection device is configured to detect whether or not the sample is a liquid. The analysis condition includes an atmospheric condition defining a state of the atmosphere in the measurement chamber. When it is detected by the detection device that the sample is a liquid, the control device is configured to prohibit or stop an operation of the exhaust device in a case in which the atmospheric condition is set to a vacuum atmosphere.

Effects of the Invention

In the above-described X-ray fluorescence analyzer, when it is detected by the detection device that the sample is a fluid in a state in which the atmospheric condition is set to a vacuum atmosphere, the operation of the exhaust device is prohibited, or the operation is stopped when the exhaust device is in operation. Therefore, according to this X-ray fluorescence analyzer, it is possible to prevent the measurement from being performed in a vacuum atmosphere with respect to a liquid sample.

EMBODIMENTS FOR CARRYING OUT THE INVENTION

Figure 1:
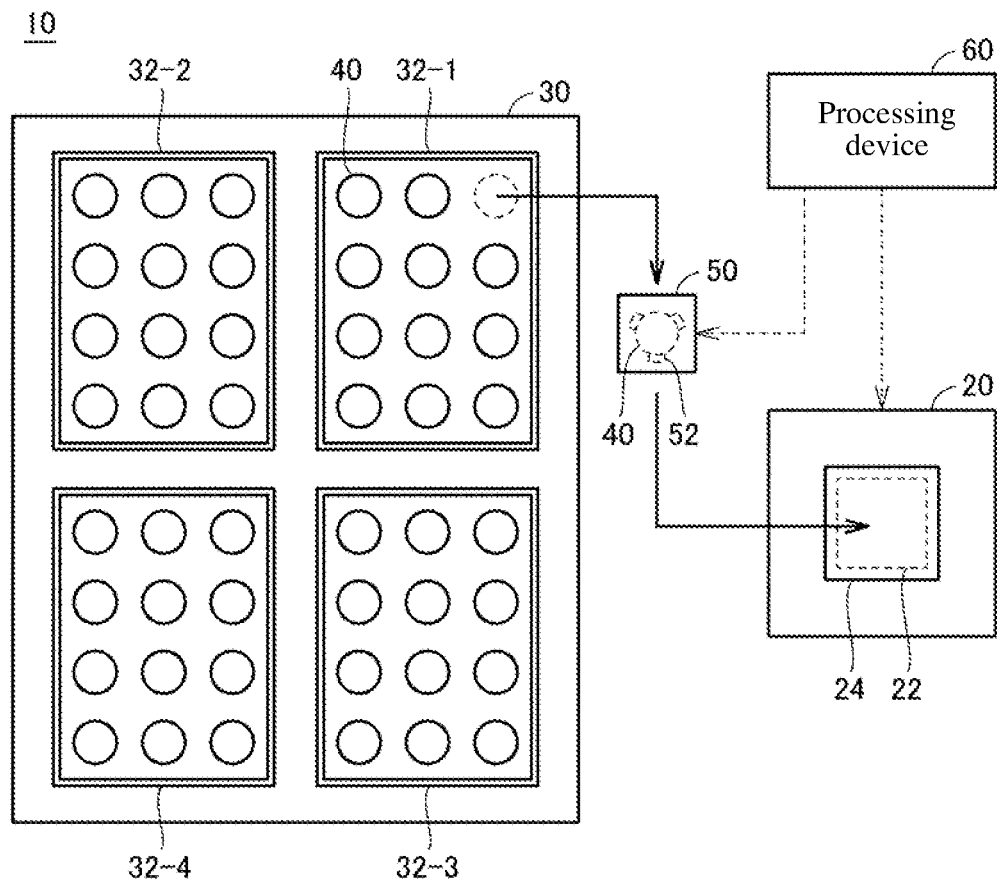
FIG. 1 is a diagram schematically showing an overall configuration of an X-ray fluorescence analyzer according to Embodiment 1 of the present disclosure.

Hereinafter, an embodiment of the present disclosure will be described in detail with reference to the attached drawings. In the drawings, the same or corresponding portions are denoted by the same reference numerals, and the description thereof will not be repeated.

Embodiment 1

<Overall Configuration of X-Ray Fluorescence Analyzer>

FIG. 1 is a diagram schematically showing an overall configuration of an X-ray fluorescence analyzer according to Embodiment 1 of the present disclosure. Referring to FIG. 1, an X-ray fluorescence analyzer 10 is provided with a measurement device 20, sample trays 32-1 to 32-4, a transfer device 50, and a processing device 60. The sample trays 32-1 to 32-4 may be provided in a sample tray carrier 30.

The measurement device 20 is provided with an energy-dispersive X-ray fluorescence analyzer (Energy Dispersive X-ray Fluorescence Spectrometer: EDX) for measuring the concentration of elements contained in a sample. In this FIG. 1, the configuration when viewed the measurement device 20 from above is shown. On the upper surface of the measurement device 20, an opening 22 for carrying the sample cell 40 (described later) into the measurement device 20, and an open-close lid 24 to be provided to the opening 22 are provided.

Each sample tray 32-1 to 32-4 allows placements of a plurality of sample cells 40. In this example, each tray 32-1 to 32-4 allows a maximum of 12 sample cells 40 to be placed therein. The sample cell 40 is a container for containing a sample and is constituted by, for example, a milky white container provided with a transparent film on an analytical surface (in this example, a lower surface) to be irradiated with X-rays. The sample cell 40 allows placements of a wide variety of samples including a powder sample and a liquid sample in addition to a solid sample. The configuration of the sample cell 40 will be described in detail later.

For each sample cell 40 placed on each of the sample trays 32-1 to 32-4, the analytical parameter defining the analysis condition in the measurement device 20 is set by the user and registered in the processing device 60. The analytical parameter includes atmospheric conditions in a measurement chamber of the measurement device 20, in addition to, for example, information about the energy of X-rays to be emitted, the primary filter and the collimator to be selected. The analysis condition is a parameter defining the state of the atmosphere in the measurement chamber at the time of measurement. In this example, any one of an ambient atmosphere, a vacuum atmosphere (the atmospheric pressure in the measurement chamber is equal to or lower than a predetermined pressure), and a helium atmosphere (the atmospheric air in the measurement chamber is replaced with a helium gas) can be selected.

The transfer device 50 transfers the sample cells 40 placed on the sample trays 32-1 to 32-4 to the measurement device 20 in a predetermined order. In this example, the transfer device 50 grasps one sample cell 40 (hereinafter, sometimes referred to as "target cell") to be measured by the gripper 52 provided at the tip end of the manipulator (not shown) and transfers it from the sample tray to the measurement device 20. Upon completion of the measurement of the sample in the target cell, the transfer device 50 transfers the target cell from the measurement device 20 to the original position on the sample tray.

The processing device 60 includes a CPU (Central Processing Unit), a memory (ROM (Read Only Memory) and RAM (Random Access Memory)), and an input/output buffer for inputting and outputting various signals (both not shown). The CPU expands the program stored in the ROM to the RAM or the like and runs the program. The program stored in the ROM is a program that describes the processing procedure of the processing device 60. In the memory, analytical parameters set and registered for each sample cell 40 placed on the sample trays 32-1 to 32-4 are also stored. The processing device 60 executes various processes in the X-ray fluorescence analyzer 10 in accordance with the programs and the analytical parameters.

Specifically, the processing device 60 stores the analytical parameters set by the user using an input device (not shown) for each sample cell 40 placed on the sample trays 32-1 to 32-4. Then, the processing device 60 selects the target cell to be measured from the sample cells 40 placed on the trays 32-1 to 32-4, and controls the transfer device 50 so as to grasp the target cell and transfer it to the measurement device 20.

The processing device 60 controls the measurement by the measurement device 20 according to the analytical parameters of the target cell stored in the memory. Prior to the initiation of the measurement, the processing device 60 controls the atmosphere in the measurement chamber of the measurement device 20 according to the analytical parameters of the target cell. Specifically, the processing device 60 controls the state of the atmosphere in the measurement chamber to any of an ambient atmosphere, a vacuum atmosphere, and a helium atmosphere according to the analytical parameters. This point will be described in detail later with reference to FIG. 2.

Once the atmosphere in the measurement chamber is adjusted, the processing device 60 starts the measurement by the measurement device 20 according to the analytical parameters of the target cell. Specifically, the processing device 60 controls the tube voltage, the tube current, and the illumination time of the X-ray tube and drives the shutter, the primary X-ray filter, and the collimator according to the analytical parameters.

Then, the processing device 60 performs analyses (qualitative analysis and quantitative analysis) of various elements contained in the sample in the target cell based on the spectrum of the secondary X-rays (fluorescent X-rays)

detected by the detector. The analysis results are stored in the memory. Upon completion of the measurements, the processing device 60 controls the transfer device 50 to grasp and transfer the target cell to its original position on the sample tray.

Note that the various processes executed by the processing device 60 are not limited to software-based processes but can be executed by dedicated hardware (electronic circuits).

<Configuration of Measurement Device 20>

Figure 2:
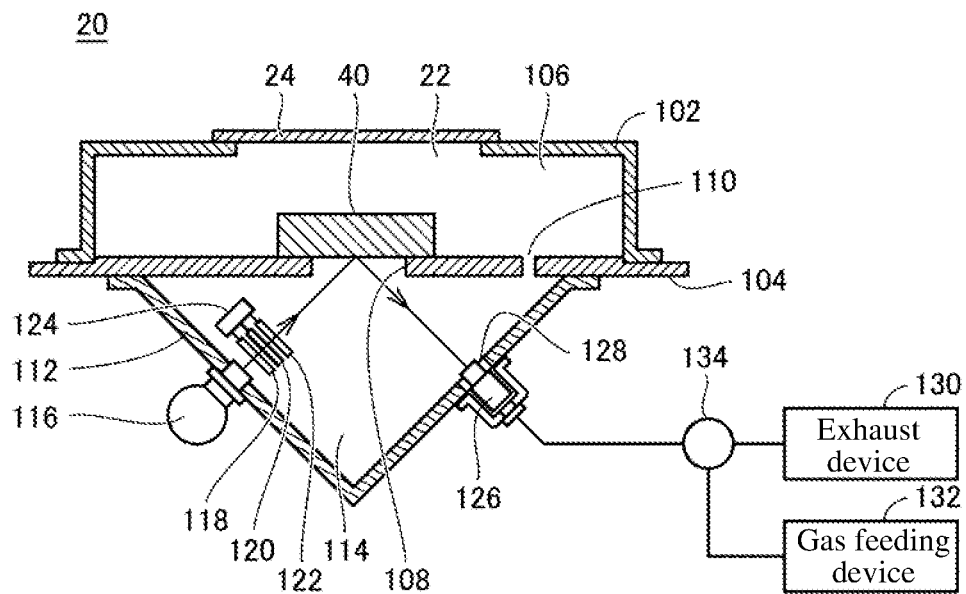
FIG. 2 is a diagram showing a configuration example of a measurement device shown in FIG. 1.

FIG. 2 is a diagram showing a configuration example of the measurement device 20 shown in FIG. 1. Referring to FIG. 2, the measurement device 20 includes housings 102 and 112 and a sample stage 104. The housing 102 is provided on the upper surface of the sample stage 104, and a sample chamber 106 is formed by the housing 102 and the sample stage 104. The housing 112 is provided on the lower surface of the sample stage 104, and a measurement chamber 114 is formed by the housing 112 and the sample stage 104. The space consisting of the sample chamber 106 and the measurement chamber 114 is hermetically enclosed by the housings 102 and 112, and the sample chamber 106 and the measurement chamber 114 communicate with each other by a connecting passage 110 provided in the sample stage 104.

The sample stage 140 is provided with an opening 108, and the sample cell 40 is placed on the sample stage 104 so as to cover the opening 108. At the time of the measurement, the sample cell 40 is placed on the sample stage 104 such that the measurement position of the sample in the sample cell 40 is exposed to the measurement chamber 114 at the opening 108. Above the opening 108 on which the sample cell 40 is placed, an opening 22 is formed in the housing 102, and an open-close lid 24 is provided at the opening 22. When the sample cell 40 is carried into the sample chamber 106 and carried out of the sample chamber 106, the open-close lid 24 becomes an open-state. At the time of the measurement, the open-close lid 24 becomes a closed state. The open-close lid 24 is configured to maintain the hermetic seal within the sample chamber 106 and the measurement chamber 114 in the closed state.

The measurement chamber 114 includes an X-ray tube 116 and a detector 126 provided to the housing 112. The X-ray tube 116 emits primary X-rays toward the lower surface of the sample cell 40. The X-ray tube 116 includes a filament and a target and generates X-rays from the target by accelerating thermal electrons generated from the filament at a high voltage to collide with the target. The primary X-rays emitted from the X-ray tube 116 are emitted to the measuring position of the sample in the sample cell 40 through the opening 108.

When the sample in the sample cell 40 is irradiated with the X-rays from the X-ray tube 116, fluorescent X-rays are generated from the sample by photoelectric effects. Since fluorescent X-rays have energy peculiar to each element, the qualitative analysis of the element contained in the sample can be performed by detecting the energy of the fluorescent X-rays by the detector 126, and the quantitative analysis of the element contained in the sample can be performed by measuring the intensity of the fluorescent X-rays. Further, the detector 126 is constituted by, for example, a semiconductor detection device including a Si (Li) element.

The measurement chamber 114 is provided with a shutter 118, a primary X-ray filter 120, and a collimator 122 therein. The shutter 118, the primary X-ray filter 120, and the collimator 122 are configured to be slidable by the drive mechanism 124 in a direction perpendicular to the optical path of the primary X-rays.

The shutter 118 is formed of an X-ray absorbing material, such as, e.g., lead, and can be inserted into the optical path of the primary X-rays when required to shield the primary X-rays. The primary X-ray filter 120 is formed by a metal foil selected according to the object and attenuates the background components of the primary X-rays emitted from the X-ray tube 116 to improve the S/N ratio of the required characteristic X-rays. Note that, in the actual device, a plurality of primary X-ray filters 120 formed of different types of metals is used, and a primary X-ray filter 120 selected according to the purpose is inserted into the optical path of the primary X-ray by the drive mechanism 124.

The collimator 122 is an aperture having a circular opening in the center and determines the size of the primary X-ray beam emitted to the sample. The collimator 122 is formed of an X-ray absorbing material, such as, e.g., lead and brass. In the actual device, a plurality of collimators 122 having different aperture diameters is arranged in a direction perpendicular to the optical path of the primary X-rays, and a collimator 122 selected according to the purpose is inserted into the optical path of the primary X-ray by the drive mechanism 124.

The exhaust device 130 is a device for exhausting the atmosphere in the sample chamber 106 and the measurement chamber 114 and includes, for example, an exhaust pump, an on-off valve, a pressure control valve, a pressure gauge, and the like. The exhaust device 130 is controlled by the processing device 60 (see FIG. 1) according to analytical parameters and can make the room in a vacuum atmosphere (e.g., 30 Pa or less) by exhausting the air in the chamber through the ventilation hole 128 and the switching valve 134.

The gas feeding device 132 is a device for supplying an atmospheric air or a helium gas into the sample chamber 106 and the measurement chamber 114 and includes, for example, an air supply pump, an on-off valve, a pressure gauge, or the like. The gas feeding device 132 is controlled by the processing device 60 according to analytical parameters. The gas feeding device 132 supplies atmospheric air into the sample chamber 106 and the measurement chamber 114 when the sample chamber 106 and the measurement chamber 114 are a vacuum atmosphere in a case where the sample chamber 106 and the measurement chamber 114 are set to an ambient atmosphere and supplies a helium gas into the sample chamber 106 and the measurement chamber 114 when the sample chamber 106 and the measurement chamber 114 are set to a helium atmosphere, through the switching valve 134 and the ventilation hole 128.

The switching valve 134 is controlled by the processing device 60. At the time of exhaust by the exhaust device 130, the switching valve 134 connects the exhaust device 130 to the ventilation hole 128 and shuts off the inflow of the gas from the exhaust device 130. On the other hand, at the time of gas feeding by the gas feeding device 132, the switching valve 134 connects the gas feeding device 132 to the ventilation hole 128 and shuts off the outflow to the exhaust device 130.

Note that in this example, the ventilation hole 128 is provided around the detector 126, but the configuration of the ventilation hole 128 is not limited thereto.

Figure 3:
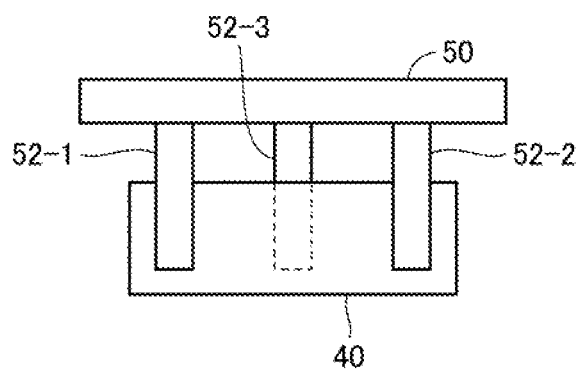
FIG. 3 is a diagram showing a configuration example of a grip portion of a transfer device shown in FIG. 1.

FIG. 3 is a diagram showing a configuration example of a grip portion of the transfer device 50 shown in FIG. 1. Referring to FIG. 3, the transfer device 50 is composed of a manipulator (not shown) and three-finger grippers 52-1 to 52-3 provided at the tip of the manipulator and can grip and transfer the sample cell 40 by the grippers 52-1 to 52-3.

<Discrimination of Liquid Sample>

In the X-ray analyzer described in Patent Document 1, a sample table capable of placing a plurality of samples thereon is provided in a sample chamber, and a plurality of samples placed on the table can be sequentially analyzed by rotating the sample table to sequentially move the plurality of samples to the observing position. In such a device, as the plurality of samples to be simultaneously placed on the sample table, it is required to collect samples to be measured basically in the same atmosphere. Therefore, and the order of measurements, etc., is restricted.

On the other hand, the X-ray fluorescence analyzer 10 of this disclosure performs batch processing in which the sample cell 40 is transferred by the transfer device 50 one by one from the sample tray to the sample chamber 106 of the measurement device 20 to perform the measurement. However, it is possible to continuously analyze a variety of samples more flexibly since the measurement can be performed by preparing a large number of samples on the sample trays 32-1 to 32-4 and setting an analysis parameter for each sample.

However, a large number of samples can be prepared, and therefore there is an increased risk that the user might erroneously set the analytical parameters. A liquid sample volatilizes in a vacuum atmosphere. Therefore, in the case of a liquid sample, an ambient atmosphere or a helium atmosphere should be selected. However, if the user accidentally sets to a vacuum atmosphere for a liquid sample, the following issues will arise. That is, there is a possibility that the degree of vacuum in the measurement chamber fails to reach a target vacuum level due to the vaporization of the liquid sample. As a result, the exhaust device 130 may be overloaded. In addition, there is a possibility that the amount or the concentration of the liquid sample changes, which prevents accurate measurement.

Therefore, in the X-ray fluorescence analyzer 10 according to Embodiment 1, it is detected whether or not the sample contained in the target cell is a liquid. Specifically, in a case where the sample accommodated in the sample cell 40 is a liquid, a seal is attached so as to block the ventilation hole provided in the upper lid of the sample cell 40, which will be described later. Therefore, by detecting whether or not the seal is attached to the upper lid of the target cell, it is detected whether or not the sample of the target cell is a liquid.

Figure 4:
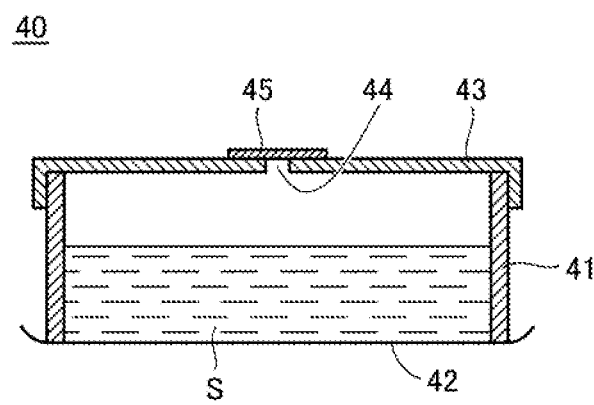
FIG. 4 is a cross-sectional view showing a configuration example of a sample cell.

FIG. 4 is a cross-sectional view showing a configuration example of the sample cell 40. Referring to FIG. 4, the side wall 41 and the upper lid 43 of the sample cell 40 are formed of, for example, a milky member made of polypropylene. A transparent film 42 (e.g., a polypropylene film) capable of transmitting X-rays is adhered to the analytical surface (in this example, a lower surface) to be irradiated with X-rays. A container is formed by the side wall 41, the transparent film 42, and the upper lid 43, and a sample S is accommodated in the sample cell 40.

The upper lid 43 is provided with a ventilation hole 44. The ventilation hole 44 is provided to prevent the transparent film 42 from peeling off or breaking by the internal pressure when the upper lid 43 is closed. After filling the sample S and closing the upper lid 43, a seal 45 is affixed to the ventilation hole 44 to prevent the volatilized liquid from being released from the ventilation hole 44 and/or to prevent the liquid itself from leaking out of the ventilation hole 44 in a case where the sample S is a liquid. This seal 45 prevents volatilization and leakage of the liquid sample and also has a function as a marker indicating that the sample in the sample cell 40 is a liquid.

Figure 5:
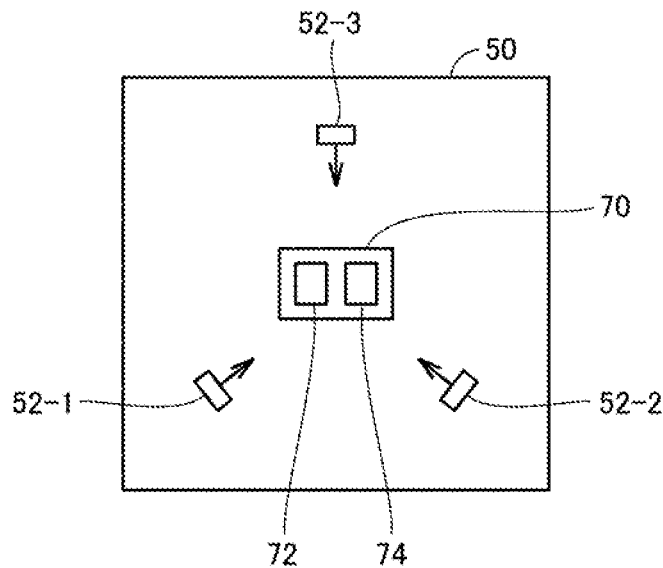
FIG. 5 is a diagram showing a configuration example of a detection device for detecting the presence or absence of a seal in a sample cell.

FIG. 5 is a diagram showing a configuration example of a detection device that detects the presence or absence of the seal 45 in the sample cell 40. Referring to FIG. 5, a reflective photo-interrupter 70 is provided in the center of the palm portion where the grippers 52-1 to 52-3 are provided in the transfer device 50. The photo-interrupter 70 includes a light-emitting element 72 and a light-receiving element 74 arranged in the same plane, and the presence or absence of a detection object can be detected by reflected light with the detection object.

During the gripping of the target cell by the grippers 52-1 to 52-3 (i.e. during the transfer of the target cell by the transfer device 50), it is detected whether or not a seal 45 is affixed to the upper lid 43 of the target cell by the photo-interrupter 70. Therefore, the seal 45 is configured so that the reflectance of light differs greatly from the reflectance of light of the upper lid 43 of the sample cell 40.

That is, in a case in which the reflectance of light of the upper lid 43 is high, the seal 45 is composed of a low reflectance color or member, and in a case in which the reflectance of light of the upper lid 43 is low, the seal 45 is composed of a high reflectance color or member. For example, in a case in which the upper lid 43 is glossy milky white (high in reflectance), the seal 45 can be glossy black (low in reflectance). In this case, during the gripping of the target cell by the grippers 52-1 to 52-3, when the light reception level of the light-receiving element 74 is high, it can be determined that the seal 45 is not attached to the target cell and therefore, the sample is not a liquid. On the other hand, when the light reception level of the light-receiving element 74 is low, it can be determined that the seal 45 is attached to the target cell and therefore, the sample is a liquid.

On the other hand, in a case in which the upper lid 43 has no gloss (low reflectivity), the seal 45 can be a glossy member, for example, made of an aluminum foil (high reflectivity). During the gripping of the target cell by the grippers 52-1 to 52-3, when the light reception level of the light-receiving element 74 is high, it can be determined that the seal 45 is affixed to the target cell and therefore, the sample is a liquid. On the other hand, when the light reception level of the light-receiving element 74 is low, it can be determined that the seal 45 is not affixed to the target cell and therefore, the sample is not a liquid.

With the above-described configuration, it is possible to determine whether or not the sample in the target cell is a liquid at the time of transferring the target cell by the transfer device 50. Thus, in a case in which the atmospheric condition is set to a vacuum atmosphere (erroneous setting by the user) at the time of measuring the target cell, the operation of the exhaust device 130 of the measurement device 20 is prohibited, which can avoid various problems described above.

Figure 6:
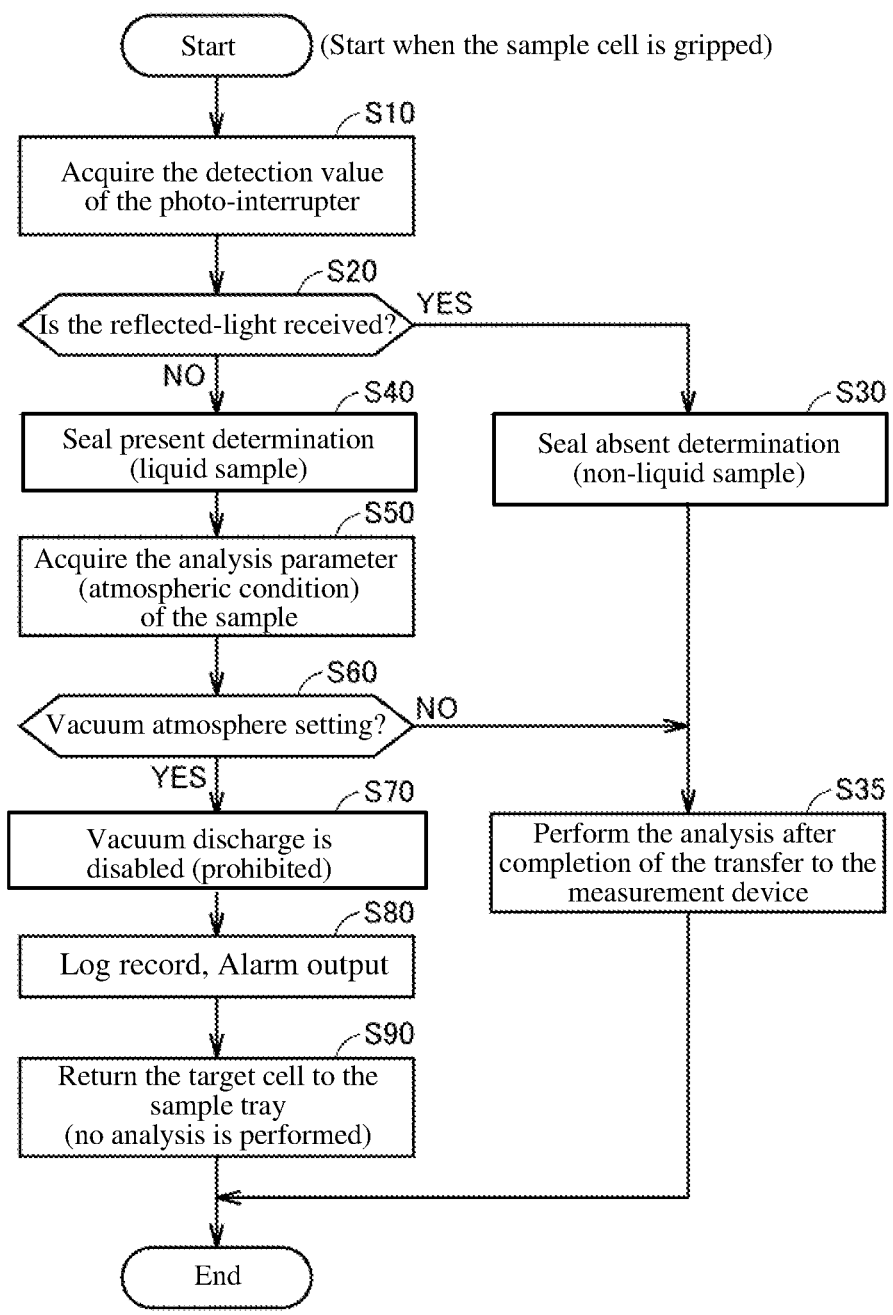
FIG. 6 is a flowchart showing an example of a procedure of a process for preventing a liquid sample from being analyzed in a vacuum atmosphere.

After prohibiting the operation of the exhaust device 130, various handling can be taken. In this Embodiment 1, when the erroneous setting of the measurement atmosphere is found, the analysis of the target cell is stopped, and the target cell is returned to the original position of the sample tray, and the log is saved. Then, the process is shifted to an analysis of the subsequent sample FIG. 6 is a flowchart showing an example of a process for preventing the liquid sample from being analyzed in a vacuum atmosphere. The process shown in this flowchart is performed by the processing device 60 shown in FIG. 1. When the target cell is gripped by the transfer device 50, the process is started. Note that, in this case, the upper lid 43 of the sample cell 40 is glossy milky white (high reflectance), and the seal 45 is non-glossy black (low reflectance).

Referring to FIG. 6, when the target cell is gripped by the transfer device 50, the processing device 60 acquires the detection value of the photo-interrupter 70 (Step S10). Then, the processing device 60 determines whether or not the reflected light is received by the photo-interrupter 70 based on the acquired detection value (Step S20). For example, when the light reception level of the light-receiving element 74 of the photo-interrupter 70 is higher than a predetermined threshold, it is determined that the reflected light is received. On the other hand, when the light reception level of the light-receiving element 74 is lower than the threshold, it is determined that the reflected light is not received.

When it is determined in Step S20 that the reflected light is received (YES in Step S20), the processing device 60 determines that the seal 45 is not attached to the target cell and therefore, the sample of the target cell is not a liquid (Step S30). When the transfer of the target cell to the measurement device 20 by the transfer device 50 is completed, the processing device 60 controls the measurement device 20 to analyze the sample contained in the target cell (Step S35).

On the other hand, when it is determined in Step S20 that the reflected light is not received (NO in Step S20), the processing device 60 determines that the seal 45 is attached to the target cell and therefore, the sample of the target cell is a liquid (Step S40).

In this case, the processing device 60 acquires an analysis parameter (at least the atmospheric condition) of the sample filled in the target cell (Step S50), and determines whether or not the atmospheric condition is a vacuum atmosphere setting when the analysis of the target cell is performed (Step S60).

When the atmospheric condition is not a vacuum atmosphere setting (NO in Step S60), the process proceeds to Step S35. When the transfer of the target cell to the measurement device 20 is completed, the sample contained in the target cell is analyzed.

On the other hand, when it is determined in Step S60 that the atmospheric condition is a vacuum atmosphere setting (YES in Step S60), the processing device 60 disables the vacuum exhaust of the measurement chamber by the exhaust device 130 (Step S70). Specifically, the operation of the exhaust device 130 is prohibited. As described above, when the atmospheric condition at the time of measuring is a vacuum atmosphere even though the target cell is filled with a liquid sample, various problems as described above may occur. For this reason, the operation of the exhaust device 130 is prohibited.

Next, the processing device 60 saves a log indicating that the atmospheric condition is erroneously set in the memory, and outputs an alarm indicating that the atmospheric condition is erroneously set to a notification device (a display, an audio device, or the like) (not shown) (Step S80). Then, the processing device 60 controls the transfer device 50 to return the target cell to the original position of the sample tray (Step S90). In other words, in this example, in a case where an atmospheric condition is set incorrectly, the target cell will not be analyzed, and the subsequent sample is analyzed after leaving a log.

As described above, according to Embodiment 1, in a case where the sample in the target cell is detected to be a liquid, the operation of the exhaust device 130 is prohibited when the atmospheric condition has been set to a vacuum atmosphere. Therefore, it is possible to prevent the liquid sample from being measured in the vacuum atmosphere.

Further, according to Embodiment 1, it is possible to assuredly and simply detect whether or not the sample in the target cell is a liquid depending on whether or not the seal 45 is attached to the upper lid 43 of the sample cell.

According to Embodiment 1, it is possible to detect whether or not the sample in the target cell is a liquid by using the target cell transfer operation by the transfer device 50 without separately providing the detection timing of the sample in the series of analyzing operations.

Modification 1 of Embodiment 1

In Embodiment 1 described above, it is configured such that the reflective photo-interrupter 70 is provided at the center of the transfer device 50, and when the target cell is transferred by the transfer device 50, it is detected whether or not the sample contained in the target cell is a liquid. However, the timing of the detection is not limited to the timing at which the liquid is transferred by the transfer device 50.

Figure 7:
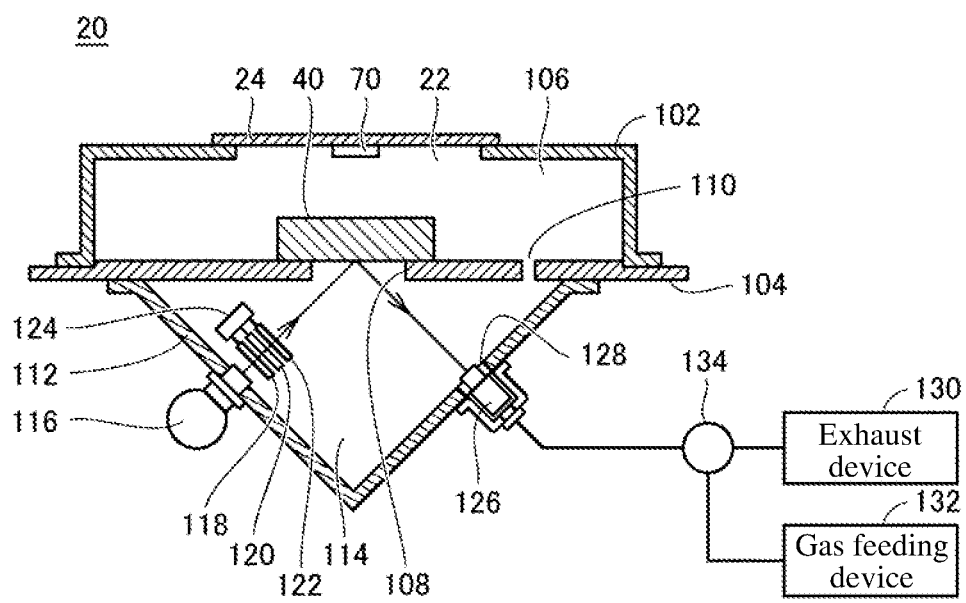
FIG. 7 is a diagram showing a configuration example of a measurement device in Modification 1 of Embodiment 1.

For example, the photo-interrupter 70 may be attached to the inner chamber side of the open-close lid 24 of the measurement device 20. FIG. 7 is a diagram showing a configuration of an example of the measurement device 20 in Modification 1. Referring to FIG. 7, in this Modification 1, the photo-interrupter 70 is attached to the inner chamber side of the open-close lid 24 instead of being attached to the transfer device 50. More particularly, the photo-interrupter 70 is attached to the inner chamber side of the open-close lid 24 above the opening 108 of the sample stage 104. The photo-interrupter 70 detects whether or not the seal 45 is attached to the upper lid 43 of the target cell in the same manner as in Embodiment 1.

In a case where the atmospheric condition is a vacuum atmosphere at the time of the measurement despite that the target cell is filled with a liquid sample, the operation of the exhaust device 130 is prohibited, or when the exhaust device 130 is being operated, the operation of the exhaust device 130 is stopped.

According to Modification 1, even in cases where the photo-interrupter 70 cannot be disposed at an appropriate position of the transfer device 50, the presence or absence of the seal 45 in the target cell can be detected by using the photo-interrupter 70.

Modification 2 of Embodiment 1

In the above-described Embodiment 1 and Modification 1, in a case in which the atmospheric condition is erroneously set for a liquid sample (vacuum atmosphere setting), the analysis of the subsequent sample is performed without performing the analysis of the target cell. However, the analysis of the target cell may be performed by changing the atmospheric condition to a setting other than a vacuum atmosphere and leaving a log.

Figure 8:
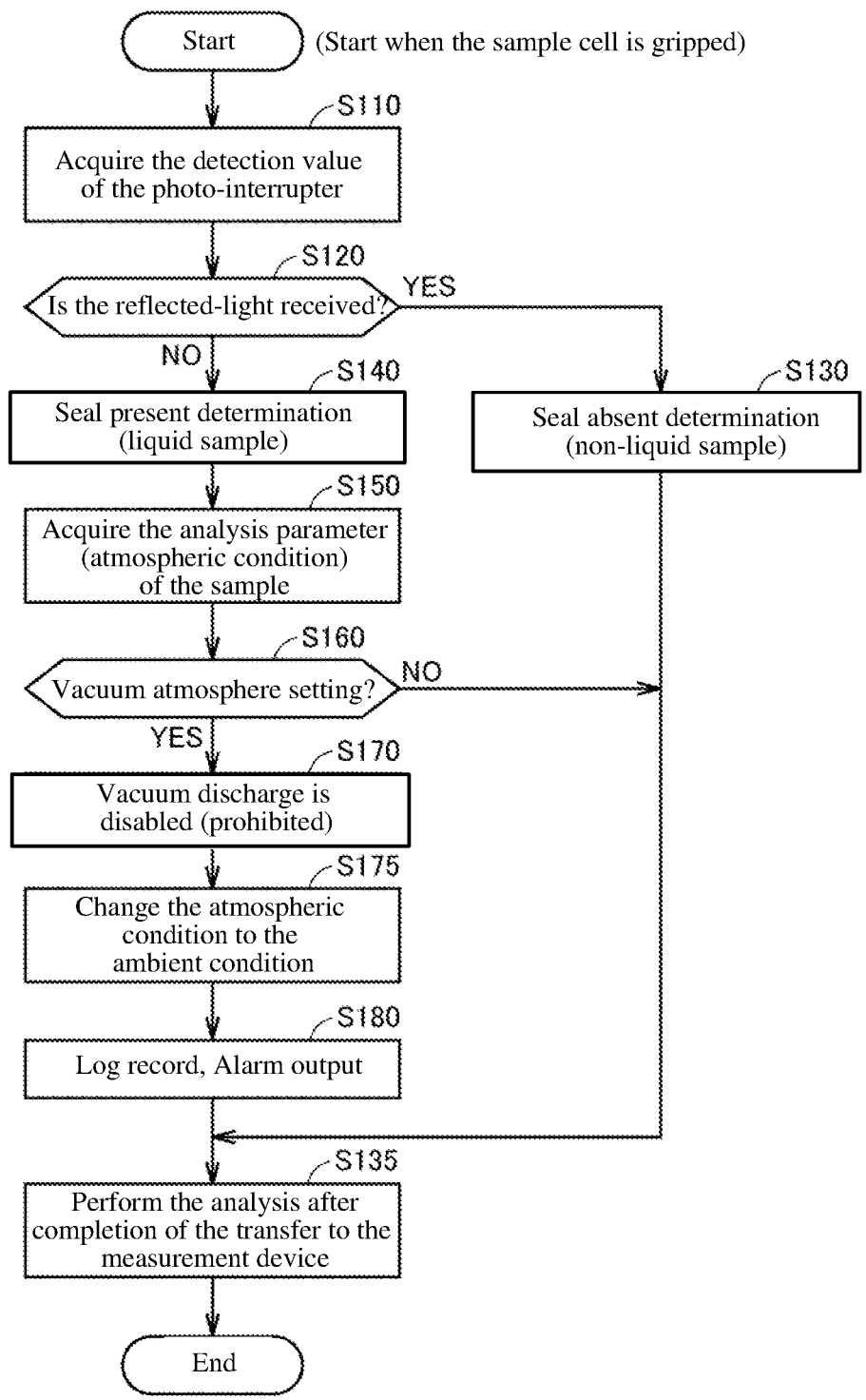
FIG. 8 is a flowchart showing an example of a procedure of a process for preventing an analysis from being performed in a vacuum atmosphere with respect to a liquid sample in Modification 2 of Embodiment 1.

FIG. 8 is a flowchart showing an example of a procedure of a process for preventing an analysis from being performed in a vacuum atmosphere with respect to a liquid sample in Modification 2. This flowchart corresponds to the flowchart of FIG. 6.

Referring to FIG. 8, the processing of Step S110 to Step S170 is the same as the processing of Step S10 to Step S70 of the flowchart shown in FIG. 6, respectively.

When the vacuum exhaust is disabled in Step S170 and the operation of the exhaust device 130 is prohibited, the processing device 60 changes the setting of the atmospheric condition from the erroneous set vacuum atmosphere to an ambient atmosphere (Step S175). The processing device 60 records a log indicating that atmospheric condition setting has been changed to the ambient atmosphere in the memory and outputs an alarm indicating that atmospheric condition setting has been changed to a notification device (a display, an audio device, or the like) (not shown) (Step S180).

Thereafter, in this Modification 2, the process proceeds to Step S135, and the transfer of the target cell to the measurement device 20 by the transfer device 50 is continued. Upon completion of the transfer, the processing device 60 controls the measurement device 20 to perform the analysis of the sample according to the changed atmospheric condition (ambient atmosphere).

In the above description, the setting of the atmospheric condition is changed to the ambient atmosphere in Step S175, but the analysis may be performed by changing the setting to a helium atmosphere.

Other Modifications

Although not illustrated in particular, in Embodiment 1 and Modifications 1 and 2, it may be determined whether or not the seal 45 is attached to the upper lid 43 of the target cell by processing the captured image using a camera (e.g., CCD camera or the like) instead of using the photo-interrupter 70.

Embodiment 2

In Embodiment 1 and the respective Modifications described above, it is detected that the sample contained in the target cell is a liquid by detecting with the photo-interrupter 70 or the camera that the seal 45 is attached to the upper lid 43 of the sample cell 40. In this Embodiment 2, instead of the detection of the seal 45, the sample in the cell is detected by an acceleration sensor to detect whether or not a liquid is present in the sample. That is, when acceleration is applied to the sample cell 40 (e.g., during the transfer, etc.), a liquid sample has a characteristic fluctuation that do not occur in a solid sample or a powder sample. Therefore, it is detected whether or not the sample accommodated in the target cell is a liquid by detecting the characteristic fluctuation of the liquid by the acceleration sensor.

The entire configuration of the X-ray fluorescence analyzer in Embodiment 2 is the same as that of the X-ray fluorescence analyzer 10 in Embodiment 1.

Figure 9:
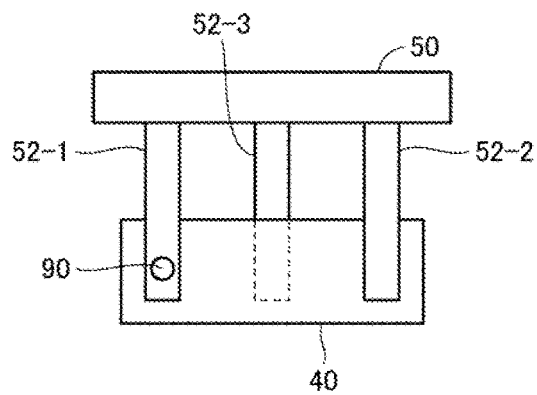
FIG. 9 is a diagram showing a configuration example of a grip portion of a transfer device in Embodiment 2.

FIG. 9 is a diagram showing a configuration example of a grip portion of the transfer device 50 in Embodiment 2. Referring to FIG. 9, an acceleration sensor 90 is provided at the grip portion of the transfer device 50. In this example, the acceleration sensor 90 is attached to the gripper 52-1, but may be attached to another gripper. Alternatively, the acceleration sensor 90 may be attached to the palm portion of the transfer device 50.

In a case where the target cell (sample) in the sample cell 40 is a liquid, when acceleration is applied to the sample cell 40, the fluctuation of the liquid sample occurs, which occurs a liquid-specific fluctuation that does not occur when the sample is a sold material or a powder material. Therefore, in the X-ray fluorescence analyzer 10 according to Embodiment 2, it is configured such that the acceleration sensor 90 detects whether or not the liquid-specific fluctuation has occurred in the target cell at the time of transferring the target cell by using the acceleration applied to the target cell in accordance with the transfer of the target cell.

A liquid fluctuation has oscillation components having a relatively long period. Therefore, for example, when an oscillation component having a predetermined period or longer is detected by the acceleration sensor 90 at the time of transferring the target cell, it is possible to determine that the sample in the target cell is a liquid.

Figure 10:
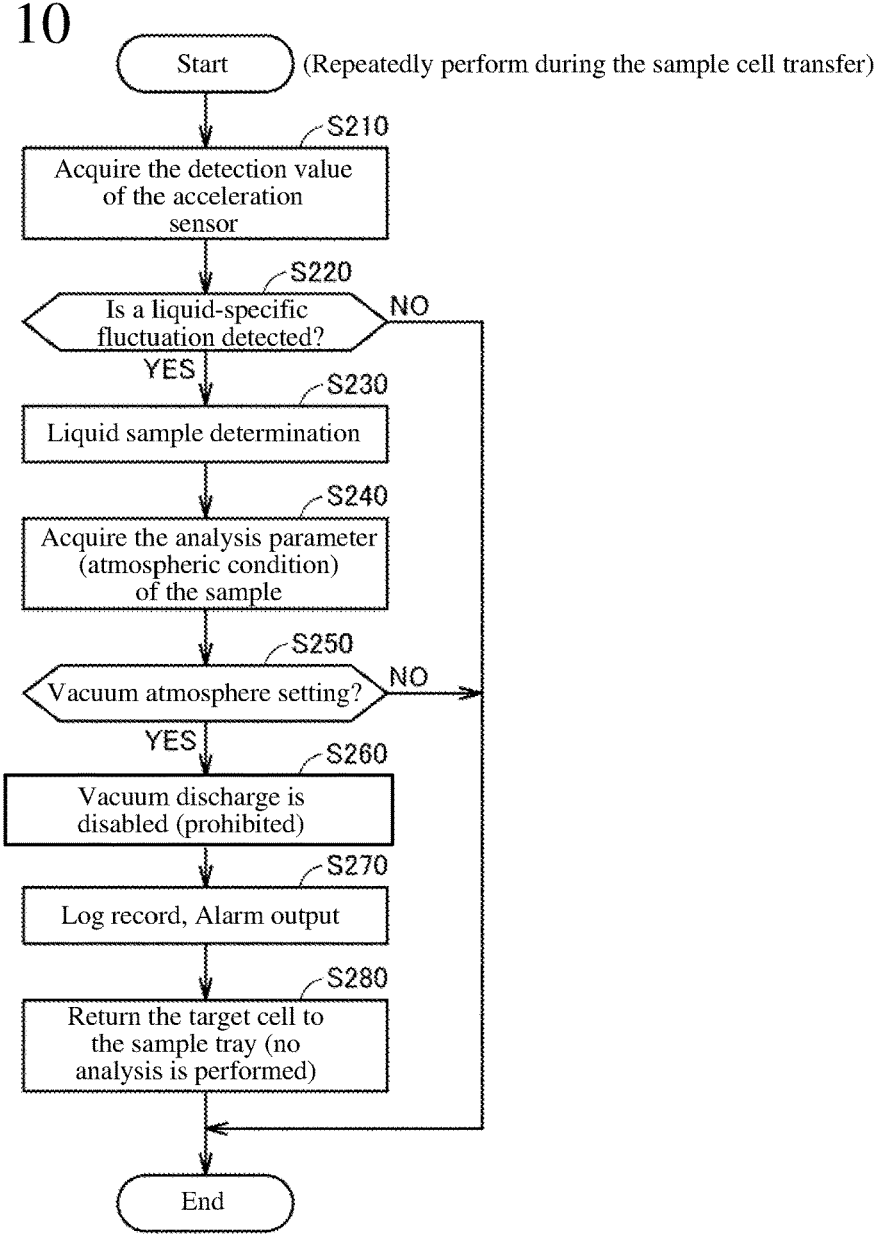
FIG. 10 is a flowchart showing an example of a procedure of a process for preventing a liquid sample from being analyzed in a vacuum atmosphere in Embodiment 2.

FIG. 10 is a flowchart showing an example of the procedure for the process of preventing the liquid sample from being analyzed in the vacuum atmosphere in Embodiment 2. This flowchart corresponds to the flowchart of FIG. 6 described in Embodiment 1. The process shown in this flowchart is also performed by the processing device 60 and is repeatedly performed during the gripping of the target cell by the transfer device 50.

Referring to FIG. 10, when the target cell is gripped by the transfer device 50, the processing device 60 acquires the detection value of the acceleration sensor 90 (Step S210). Then, the processing device 60 determines whether or not the acquired detection value includes a liquid-specific fluctuation (Step S220). For example, the processing device 60 calculates the frequency spectrum of the detection value of the acceleration sensor 90 in a predetermined period, and it is determined that the liquid-specific oscillation is occurring when the oscillation component of the predetermined period or longer (the predetermined frequency or less) is included. The predetermined period (predetermined frequency) can be appropriately determined by an evaluation test in advance, a simulation, or the like.

When no liquid-specific fluctuation is detected in Step S220 (NO in Step S220), the processing device 60 shifts the process to the returning process without executing the subsequent series of processing.

When a liquid-specific fluctuation is detected in Step S220 (YES in Step S220), the processing device 60 determines that the sample accommodated in the target cell is a liquid (Step S230). In this example, the processing device 60 acquires an analysis parameter (at least atmospheric condition) of the sample of the target cell (Step S240) and determines whether or not the atmospheric condition at the time of performing the analysis of the target cell is a vacuum atmosphere setting (Step S250). The processing from Step S240 to Step S280 is the same as the processing from Step S50 to Step S90 of the flowchart shown in FIG. 6. Therefore, the explanation thereof will not be repeated.

As described above, according to Embodiment 2, since a fluctuation of the sample accommodated in the sample cell is detected by the acceleration sensor 90, it is possible to more assuredly detect whether or not the sample in the sample cell is a liquid (for example, in Embodiment 1, there is a possibility that the seal 45 is erroneously attached).

Modification 1 of Embodiment 2

In cases where the acceleration applied to the target cell as accompanied by the transfer of the target cell causes a small fluctuation of the liquid sample, which does not allow the detection of the fluid-specific fluctuation by the acceleration sensor 90, the target cell may be vibrated positively.

Figure 11:
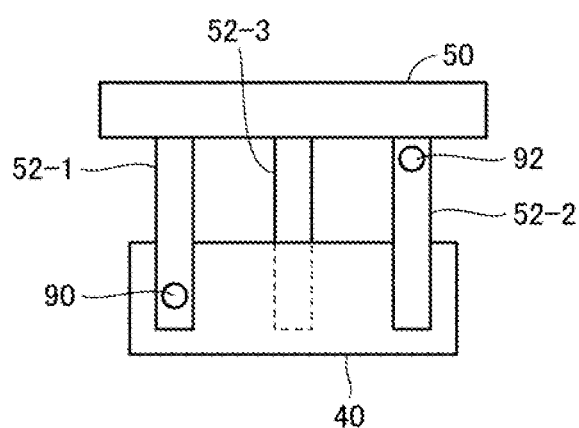
FIG. 11 is a diagram showing a configuration example of a grip portion of a transfer device in Modification 1 of Embodiment 2.

FIG. 11 is a diagram showing a configuration example of a grip portion of the transfer device 50 in Modification 1 of Embodiment 2. Referring to FIG. 11, the grip portion of the transfer device 50 is provided with, in addition to the acceleration sensor 90, a piezoelectric element (piezoelectric elements) 92. In this embodiment, the piezoelectric element 92 is attached to the gripper 52-2 but may be attached to another gripper.

Alternatively, it may be attached to the palm portion of the transfer device 50.

The target cell can be forcibly vibrated by a vibrator such as the piezoelectric element 92 by applying an appropriate voltage to the piezoelectric element 92 during the transfer of the target cell. Based on the detection value of the acceleration sensor 90 at this time, as described in Embodiment 2, it is detected whether or not liquid-specific fluctuation has occurred in the target cell.

According to this Modification 1, since the target cell is positively vibrated by the piezoelectric element 92, when the sample contained in the target cell is a liquid, the fluctuation of the liquid sample can be increased. Consequently, it becomes possible to clearly distinguish between a liquid sample and a non-liquid sample.

Modification 2 of Embodiment 2

In Embodiment 2 described above, the acceleration sensor 90 detects the fluctuation of the sample in the target cell at the time of transferring the target cell, and in Modification 1, the piezoelectric element 92 is used to vibrate the target cell. However, the sample fluctuation may be detected using an optical sensor instead of the acceleration sensor, or the target cell may be vibrated by other vibration means instead of the piezoelectric element 92.

Figure 12:
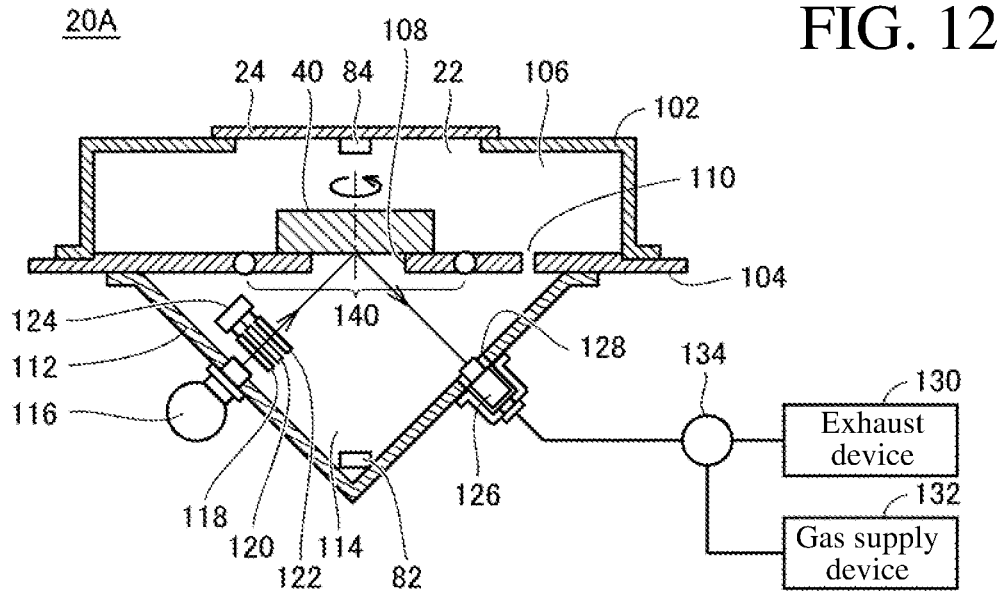
FIG. 12 is a diagram showing a configuration example of a measurement device in Modification 2 of Embodiment 2.

FIG. 12 is a diagram showing a configuration example of a measurement device 20A in Modification 2 of Embodiment 2. This measurement device 20A corresponds to a measurement device 20 of FIG. 2 described in Embodiment 1.

Referring to FIG. 12, this measurement device 20A further includes a light source 82, an optical sensor 84, and a rotary table 140 in the configuration of the measurement device 20 shown in FIG. 2. The light source 82 is provided below the opening 108 of the sample stage 104 and is provided to emit the light to the opening 108. For example, an LED can be used as the light source 82.

The optical sensor 84 is provided on the inner chamber side of the open-close lid 24 above the opening 108 of the sample stage 104. The optical sensor 84 receives the light from light source 82 transmitted through the target cell placed on the sample stage 104.

The rotary table 140 is configured to rotate the target cell on the sample stage 104 so as to be rotatable about the axis about the normal direction of the sample stage 104. By providing such a rotary table 140, the measuring position of the sample placed on the sample stage 104 can be changed.

In this Modification 2, the target cell is vibrated using this rotary table 140, and the liquid level fluctuation of the sample in the target cell at that time is detected using the optical sensor 84. That is, when the liquid level of the liquid surface of the sample in the target cell fluctuates, the transmitted light of the target cell changes according to the fluctuation (for example, the brightness of the transmitted light changes, or the shading is generated in the transmitted light changes, according to the fluctuation). Therefore, it is possible to determine that the sample in the target cell is a liquid when the transmitted light detected by the optical sensor 84 shows a change in accordance with the fluctuation of the liquid level when the target cell is vibrated by using the rotary table 140.

Figure 13:
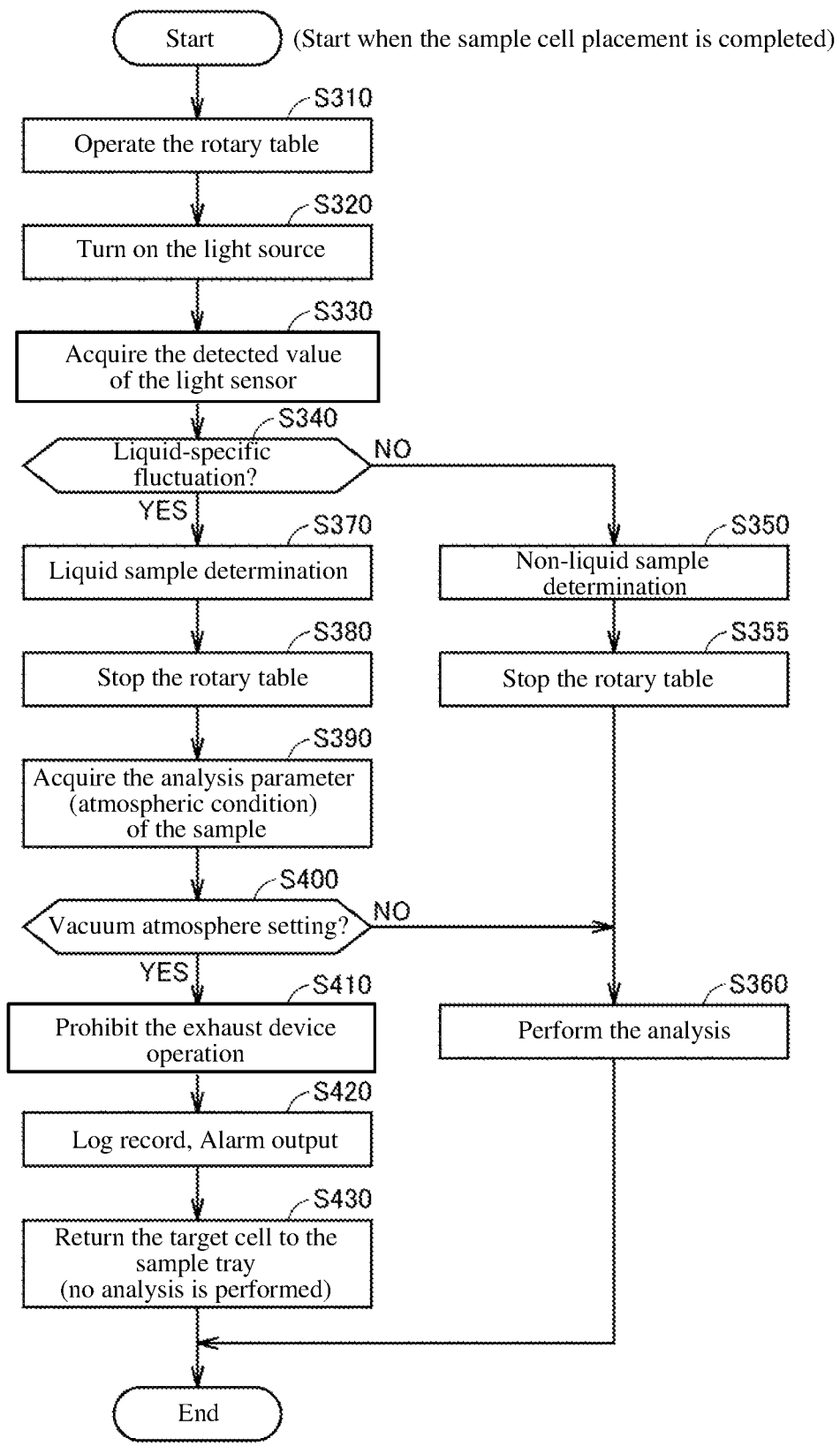
FIG. 13 is a flowchart showing an example of a procedure of a process for preventing an analysis from being performed in a vacuum atmosphere with respect to a liquid sample in Modification 2 of Embodiment 2.

FIG. 13 is a flowchart showing an example of the process for preventing the liquid sample from being analyzed in a vacuum atmosphere in this Modification 2. This flowchart corresponds to the flowchart of FIG. 6 described in Embodiment 1. The process shown in this flowchart is performed when the target cell is placed on the sample stage 104 of the measurement device 20 by the transfer device 50.

Referring to FIG. 13, when the target cell is placed on the sample stage 104 of the measurement device 20, the processing device 60 activates the rotary table 140 to apply an acceleration to the target cell (Step S310). For example, the processing device 60 repeatedly rotates and stops the rotary table 140. The processing device 60 turns on the light source 82 (Step S320) and acquires the detection values of the optical sensor 84 (Step S330).

Based on the detection values of the optical sensor 84, the processing device 60 determines whether or not a liquid-specific fluctuation has occurred in the sample accommodated in the target cell (Step S340). For example, in cases where the detection value of the optical sensor 84 fluctuates greatly with the rotation/stop of the rotary table 140, it can be determined that a liquid-specific fluctuation is occurring.

When it is determined that no liquid-specific fluctuation has occurred when the rotary table 140 is activated (NO in Step S340), the processing device 60 determines that the sample contained in the target cell is not a liquid sample (a solid sample or a powder sample) (Step S350). The processing device 60 stops the rotary table 140 (Step S355) and controls the measurement device 20 to analyze the sample contained in the target cell (Step S360).

On the other hand, when it is determined in Step S340 that the liquid-specific fluctuation has occurred (YES in Step S340), the processing device 60 determines that the sample contained in the target cell is a liquid sample (Step S370). After stopping the rotary table 140 (Step S380), the processing device 60 acquires the analysis parameter (at least an atmospheric condition) of the sample contained in the target cell (Step S390) and determines whether or not the atmospheric condition at the time of the target cell analysis is a vacuum atmosphere setting (Step S400). Since the processing of Step S390 to Step S430 is the same as the processing of Step S50 to Step S90 of the flowchart shown in FIG. 6, the explanation thereof will not be repeated.

As described above, according to Modification 2 of Embodiment 2, it is possible to detect whether or not the sample is a liquid by using the light source 82 and the optical sensor 84 even when the acceleration sensor 90 cannot detect the liquid-specific fluctuation due to the small quantity of the sample.

Further, according to Modification 2, a vibration can be applied to target cell by using rotary table 140 of the sample stage 104 without separately providing a vibration applying unit for applying a vibration to the target cell.

Modification 3 of Embodiment 2

Figure 14:
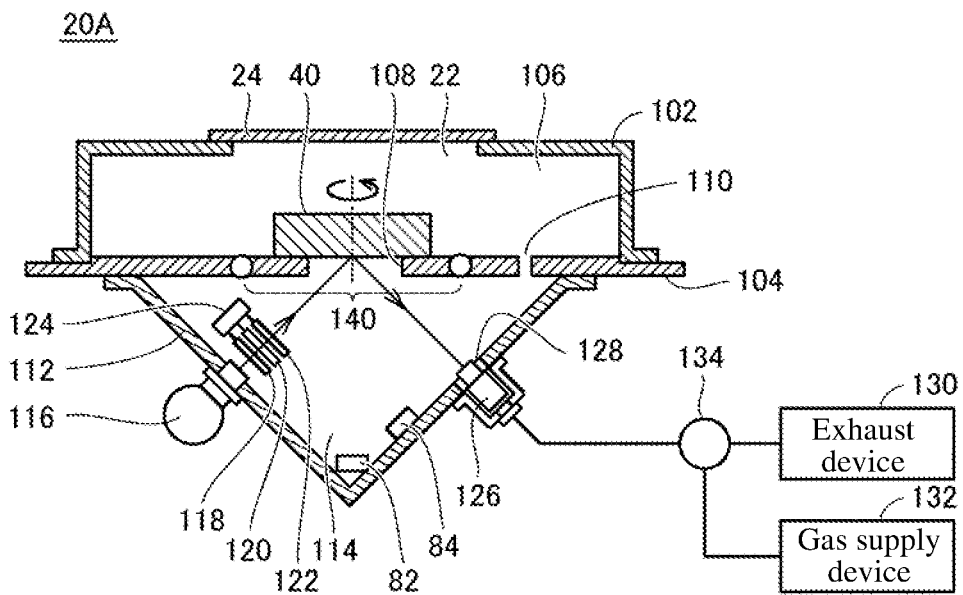
FIG. 14 is a diagram showing a configuration example of a measurement device in Modification 3 of Embodiment 2.

In the above Modification 2, the light source 82 and the optical sensor 84 are attached to the measurement chamber 114 and the sample chamber 106, respectively. However, as shown in FIG. 14, it may be configured such that both the light source 82 and the optical sensor 84 are attached to the measurement chamber 114 and it is determined whether or not the sample contained in the target cell is a liquid by detecting the reflected light from the sample contained in the target cell by the optical sensor 84.

That is, when the liquid level of the sample contained in the target cell fluctuates, not only the transmitted light but also the reflected light from the sample also change according to the fluctuation (for example, the brightness of the reflected light changes according to the fluctuation, or the shading is generated in the reflected light). Therefore, even in cases where the reflected light detected by the optical sensor 84 shows a change in accordance with the fluctuation of the liquid level when the target cell is vibrated by using the rotary table 140, it can be determined that the sample contained in the target cell is a liquid.

Since the processing of the processing device 60 in Modification 3 is basically the same as the processing shown in the flowchart described with reference to FIG. 13 of Modification 2, the explanation will not be repeated.

More Modification

Although not shown in particular, in Modifications 2 and 3 of Embodiment 2, instead of the optical sensor 84, a camera (e.g., CCD camera or the like) may be used to detect whether or not the sample surface is fluctuating when the target cell is vibrated by the rotary table 140.

Further, in Embodiment 2 and Modification 1 described above, it is determined whether or not the sample is a liquid at the time of transfer by the transfer device 50. Further, in Modification 2 and 3 of Embodiment 2, it is determined whether or not the sample is a liquid when the target cell is placed on the sample stage 104 of the measurement device 20. However, it may be configured to determine whether or not the sample is a liquid when the sample cell 40 is on the sample tray.

Figure 15:
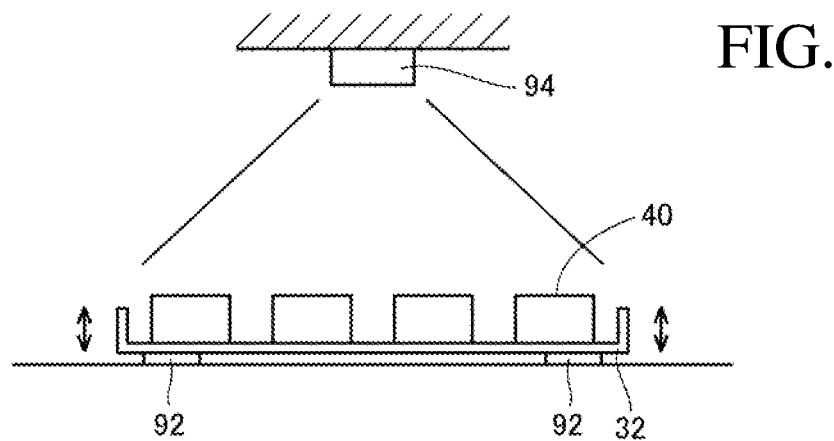
FIG. 15 is a diagram showing a configuration example capable of applying a vibration to a sample cell placed on a sample tray.

FIG. 15 is a diagram showing a configuration example capable of vibrating the sample cells 40 placed on a sample tray. Note that, in FIG. 15, the sample trays 32-1 to 32-4 are shown comprehensively as a sample tray 32.

Referring to FIG. 15, piezoelectric elements (piezoelectric devices) 92 are provided between the sample tray 32 and a pedestal on which sample trays 32 are placed. A camera 94 (CCD camera or the like) is provided above the sample tray 32.

In a state in which the sample cells 40 placed on the sample tray 32, the sample cells 40 can be forcibly vibrated by the piezoelectric elements 92 by applying an appropriate voltage to the piezoelectric elements 92. In this case, it is possible to determine whether or not the sample contained in the sample cell 40 placed on the sample tray 32 is a liquid by detecting whether or not a liquid-specific fluctuation has occurred in the sample contained in the sample cell 40 by the camera 94

Further, in Embodiment 1 and Modifications thereof described above, in order to prevent the volatilization and the leakage of the liquid sample in a case where the sample is a liquid and to indicate that the sample contained in the sample cell 40 is a liquid, the seal 45 is used. However, another member may be used as long as it has the above function equivalent to that of the seal 45

As another embodiment, although not particularly illustrated, a detection location for detecting whether or not the sample contained in the target cell is a liquid may be separately provided in the middle of the transfer from the sample trays 32-1 to 32-4 to the measurement device 20. Then, at the detection location, a vibration device (piezoelectric elements 92, etc.) to vibrate the target cell and a detection device (an acceleration sensor 90, an optical sensor 84, a camera 94, etc.) for detecting the fluctuation of the sample contained in the target cell vibrated by the vibration device may be provided to detect whether or not the sample contained in the target cell is a liquid.

Aspects

It would be understood by those skilled in the art that the plurality of exemplary embodiments described above and Modifications thereof are specific examples of the following aspects.

(Item 1)

An X-ray fluorescence analyzer according to one aspect of the present invention is an X-ray fluorescence analyzer for analyzing a sample by irradiating a surface of the sample with X-rays and detecting fluorescent X-rays generated from the surface. The X-ray fluorescence analyzer includes:

a measurement chamber configured to perform irradiation of the X-rays and detection of the fluorescent X-rays;

an exhaust device configured to exhaust an atmosphere in the measurement chamber;

a control device configured to analyze the sample according to an analysis condition set by a user; and a detection device configured to detect whether or not the sample is a liquid, wherein the analysis condition includes an atmospheric condition defining a state of the atmosphere in the measurement chamber, and wherein when it is detected by the detection device that the sample is a liquid, the control device is configured to prohibit or stopped an operation of the exhaust device in a case in which the atmospheric condition is set to a vacuum atmosphere.

According to the X-ray fluorescence analyzer according to Item 1, when the detection device detects that the sample is a liquid in a case in which the atmospheric condition is set to a vacuum atmosphere, the operation of the exhaust device is prohibited, or when the exhaust device is in operation, the operation of the exhaust device is stopped. Therefore, it is possible to prevent the liquid sample from being measured in the vacuum atmosphere.

(Item 2)

In the X-ray fluorescence analyzer recited in the above-described Item 1, the X-ray fluorescence analyzer as recited in claim 1, further includes:

a sample tray provided outside the measurement chamber, the sample tray being configured to place a plurality of sample cells each containing the sample therein; and a transfer device configured to individually transfer the sample cell placed on the sample tray to the measurement chamber, wherein the analysis condition is set for each sample cell on the sample tray, and wherein the control device is configured to analyze the sample according to a set analysis condition for each sample cell transferred to the measurement chamber by the transfer device.

According to the X-ray fluorescence analyzer described in the above-described Item 2, it is possible to prepare a large number of samples in the sample tray and perform the measurement by setting an analysis condition for each sample. Therefore, a wide variety of samples can be sequentially analyzed more flexibly. While the user is at increased risk of missetting the analysis condition due to the availability of a large number of samples, according to the X-ray fluorescence analyzer, when the atmospheric condition of the target cell is set to a vacuum atmosphere, the operation of the exhaust device is prohibited, when the exhaust device is in operation, the operation of the exhaust device is stopped. Therefore, it is possible to prevent the liquid sample from being measured in a vacuum atmosphere.

(Item 3)

In the X-ray fluorescence analyzer recited in the above-described Item 2, each of the plurality of sample cells is provided with an upper lid with a ventilation hole, a member configured to close the ventilation hole is attached to the upper lid of the sample cell containing a liquid sample therein, the detection device is configured to detect presence or absence of the member, and the control device is configured to prohibit or stopped the operation of the exhaust device in a case in which the member is detected by the detection device in a target cell which is a sample cell to be analyzed and the atmospheric condition of the target cell is set to the vacuum atmosphere.

According to the X-ray fluorescence analyzer described in Item 3, it is possible to assuredly and easily detect whether or not the sample in the target cell is a liquid, depending on whether or not the member (seal) is attached to the upper lid of the sample cell.

(Item 4)

In the X-ray fluorescence analyzer recited in the above-described Item 3, the transfer device includes a grip portion configured to grip the target cell at the time of transferring the target cell, and the detection device includes a reflective photo-interrupter or a camera, the detection device being attached to a grip portion of the transfer device.

According to the X-ray fluorescence analyzer described in Item 4, it is possible to detect whether or not the sample in the target cell is a liquid by using the target cell transfer operation without separately providing the detection timing by the detection device in the series of analytical operations including the transfer of the target cell.

(Item 5)

In the X-ray fluorescence analyzer recited in the above-described Item 3, the detection device includes a reflective photo-interrupter or a camera, the detection device being provided above a sample stage for placing the target cell thereon in the measurement chamber.

According to the X-ray fluorescence analyzer described in Item 5, it is possible to detect whether or not the sample in the target cell is a liquid at the timing at which the target cell is placed on the sample stage without separately providing the detection timing by the detection device in a series of analyzing operations.

(Item 6)

In the X-ray fluorescence analyzer recited in the above-described Item 2, the detection device is configured to detect whether or not the sample in the sample cell is a liquid by detecting a fluctuation of the sample in the sample cell when an acceleration is applied to the sample cell.

According to the X-ray fluorescence analyzer described in Item 6, since the fluctuation of the sample in the sample cell is detected, it is possible to more assuredly detect whether or not the sample in the sample cell is a liquid (for example, even if there is an erroneous setting of the member described in Item 3).

(Item 7)

In the X-ray fluorescence analyzer recited in the above-described Item 6, the detection device includes an acceleration sensor, the detection device being attached to the transfer device.

According to the X-ray fluorescence analyzer described in Item 7, it is possible to easily detect whether or not the sample in the sample cell is a liquid by using an acceleration sensor at the time of transferring the target cell.

(Item 8)

In the X-ray fluorescence analyzer recited in the above-described Item 7, the X-ray fluorescence analyzer further includes:

a vibration device attached to the transfer device, the vibration device being configured to apply a vibration to the sample cell.

According to the X-ray fluorescence analyzer described in Item 8, since the vibration device is provided, in a case where the sample in the target cell is a liquid, the fluctuation of the liquid sample can be increased, so that the liquid sample and the non-liquid sample can be clearly distinguished from each other.

(Item 9)

In the X-ray fluorescence analyzer recited in the above-described Item 6, the X-ray fluorescence analyzer further includes:

a vibration device configured to apply a vibration to the sample cell, wherein the detection device includes:

a light source configured to irradiate the sample in the sample cell with visible light; and a light-detection device configured to detect transmitted light transmitted through the sample in the sample cell or reflected light reflected by the sample in the sample cell, when the visible light is being emitted from the light source.

According to the X-ray fluorescence analyzer described in Item 9, it is possible to detect whether or not the sample is a liquid even in a case where the acceleration sensor cannot detect the liquid-specific fluctuation due to the small quantity of the sample.

(Item 10)

In the X-ray fluorescence analyzer recited in the above-described Item 9, the vibration device is a rotary table for rotating the target cell placed in the measurement chamber.

According to the X-ray fluorescence analyzer described in Item 10, a vibration can be applied to the target cell by using an existing rotary table without separately providing a vibration application means for applying a vibration to the sample cell.

(Item 11)

In the X-ray fluorescence analyzer recited in the above-described Item 9, the vibration device is configured to apply a vibration to the sample tray.

According to the X-ray fluorescence analyzer of Item 11, it is possible to collectively detect at once whether or not the sample in each sample cell is a liquid for a plurality of sample cells placed on the sample tray.

The embodiments disclosed this time are scheduled to be implemented in combination as appropriate to the extent that they are not technically inconsistent. The embodiments disclosed herein are to be considered in all aspects as illustrative and not restrictive. The scope of the present invention is indicated by the claims rather than by the descriptions of the embodiments described above, and it is intended to include all modifications within the meanings and ranges equivalent to those of the claims.

DESCRIPTION OF SYMBOLS

10: X-ray fluorescence analyzer
20, 20A: Measurement device
22, 108: Opening
24: Open-close lid
32-1 to 32-4: Sample tray
40: Sample cell
41: Side wall
42: Transparent film
43: Upper lid
44: Ventilation hole
45: Seal
50: Transfer device
52-1 to 52-3: Gripper
60: Processing device
70: Photo-interrupter
72: Light-emitting element
74: Light-receiving element 82: Light source
84: Optical sensor
90: Acceleration sensor
92: Piezoelectric element
94: Camera
102, 112: Housing
104: Sample table
106: Sample chamber
110: Connecting passage
114: Measurement chamber
116: X-ray tube
118: Shutter
120: Primary X-ray filter
122: Collimator
124: Drive mechanism
126: Detector
128: Ventilation hole
130: Exhaust device
132: Gas feeding device
134: Switching valve
140: Rotary table
S: Sample

The invention claimed is:

1. An X-ray fluorescence analyzer for analyzing a sample by irradiating a surface of the sample with X-rays and detecting fluorescent X-rays generated from the surface, the X-ray fluorescence analyzer comprising:
   a measurement chamber configured to perform an irradiation of the X-rays and a detection of the fluorescent X-rays;
   an exhaust configured to exhaust an atmosphere in the measurement chamber;
   a processing device configured to analyze the sample according to an analysis condition set by a user; and
   a detector configured to detect whether or not the sample is a liquid,
   wherein the analysis condition includes an atmospheric condition defining a state of the atmosphere in the measurement chamber, and
   wherein when it is detected by the detector that the sample is a liquid, the processing device is configured to prohibit or stop an operation of the exhaust in a case in which the atmospheric condition is set to a vacuum atmosphere.

2. The X-ray fluorescence analyzer as recited in claim 1, further comprising:
   a sample tray provided outside the measurement chamber and on which a plurality of sample cells are placed, each of the plurality of sample cells containing the sample therein; and
   a transfer device configured to individually transfer the plurality of sample cells from the sample tray to the measurement chamber,
   wherein the analysis condition is set for each of the plurality of sample cells on the sample tray, and
   wherein the processing device is configured to analyze the sample according to a set analysis condition for each of the plurality of sample cells transferred to the measurement chamber by the transfer device.

3. The X-ray fluorescence analyzer as recited in claim 2,
   wherein each sample cell of the plurality of sample cells comprises an upper lid with a ventilation hole and a member configured to close the ventilation hole,
   wherein the member is attached to the upper lid of a sample cell containing a liquid sample therein,
   wherein the detector is configured to detect a presence or an absence of the member, and
   wherein the processing device is configured to prohibit or stop the operation of the exhaust a case in which the member is detected by the detector in a target cell, which is a sample cell to be analyzed and the atmospheric condition of the target cell is set to the vacuum atmosphere.

4. The X-ray fluorescence analyzer as recited in claim 3,
   wherein the transfer device includes a grip portion configured to grip the target cell at a time of transferring the target cell, and
   wherein the detector includes a reflective photo-interrupter or a camera, the detector being attached to the grip portion of the transfer device.

5. The X-ray fluorescence analyzer as recited in claim 3, further comprising:
   a sample chamber formed by a sample stage for placing the target cell thereon and a housing,
   wherein the detector includes a reflective photo-interrupter or a camera, the detector being provided above an opening of the sample stage in the sample chamber.

6. The X-ray fluorescence analyzer as recited in claim 2,
   wherein, for each of the plurality of sample cells transferred to the measurement chamber by the transfer device, the detector is configured to detect whether or not the sample in each of the sample cells is a liquid by detecting a fluctuation of the sample in each of the plurality of sample cells.

7. The X-ray fluorescence analyzer as recited in claim 6,
   wherein the detector includes an acceleration sensor, the detector being attached to the transfer device.

8. The X-ray fluorescence analyzer as recited in claim 7, further comprising:
   a vibrator attached to the transfer device, the vibrator being configured to apply a vibration to each of the plurality of sample cells.

9. The X-ray fluorescence analyzer as recited in claim 6, further comprising:
   a vibrator configured to apply a vibration to each of the plurality of sample cells,
   wherein the detector includes:
      a light source configured to irradiate the sample in each of the plurality of sample cells with visible light; and
      a light detector configured to detect visible light transmitted through the sample in each of the plurality of sample cells, or visible light reflected by the sample in each of the plurality of sample cells when the visible light is being irradiated from the light source.

10. The X-ray fluorescence analyzer as recited in claim 9,
    wherein the vibrator comprises a rotary table for rotating a target cell, which is a sample cell to be analyzed, placed in the measurement chamber.

11. The X-ray fluorescence analyzer as recited in claim 9,
    wherein the vibrator is configured to apply a vibration to the sample tray.

* * * * *